United States Patent
Wang et al.

(10) Patent No.: US 8,467,315 B2
(45) Date of Patent: Jun. 18, 2013

(54) METHOD AND APPARATUS FOR IMPLEMENTING K-SHORTEST PATHS ALGORITHM IN THE CASE OF EXISTING MULTIPLE EDGES BETWEEN ADJACENT NODES

(75) Inventors: Dajiang Wang, Shenzhen (CN); Zhenyu Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 129 days.

(21) Appl. No.: 13/257,609

(22) PCT Filed: Sep. 2, 2009

(86) PCT No.: PCT/CN2009/073696
§ 371 (c)(1),
(2), (4) Date: Nov. 3, 2011

(87) PCT Pub. No.: WO2010/127527
PCT Pub. Date: Nov. 11, 2010

(65) Prior Publication Data
US 2012/0044835 A1    Feb. 23, 2012

(30) Foreign Application Priority Data
May 6, 2009    (CN) .................. 2009 1 01071817

(51) Int. Cl.
*H04L 12/28* (2006.01)
(52) U.S. Cl.
USPC .......................................... 370/255; 370/401

(58) Field of Classification Search
None
See application file for complete search history.

(56) References Cited

U.S. PATENT DOCUMENTS

| 7,082,531 B1 | 7/2006 | Chen et al. |
| 2008/0225723 A1 | 9/2008 | Lee et al. |

FOREIGN PATENT DOCUMENTS

| CN | 1518297 A | 8/2004 |
| CN | 101354435 A | 1/2009 |

OTHER PUBLICATIONS

International Search Report issued in PCT/CN2009/073696 dated Jan. 6, 2010.

*Primary Examiner* — David Oveissi
(74) *Attorney, Agent, or Firm* — McClure, Qualey & Rodack, LLP

(57) ABSTRACT

The present invention discloses a method and apparatus for implementing a K-shortest paths algorithm in a condition of multiple sides between adjacent nodes. The implementing method comprises: recording original topology information into a topology structure; adding one virtual node into each of the original sides other than the one with the shortest weight between the two nodes respectively to divide each of the original sides except for the original side with the shortest weight into two new sides, a weight of the new side being obtained by splitting a weight of the original edge where the new side locates; according to new topology information after adding virtual nodes, calculating K-shortest paths between designated nodes; and checking each path in the calculated K-shortest paths in sequence: reinstituting hops which belong to virtual nodes and new sides in each path into the original topology information recoded in said topology structure.

12 Claims, 2 Drawing Sheets

METHOD AND APPARATUS FOR IMPLEMENTING K-SHORTEST PATHS ALGORITHM IN THE CASE OF EXISTING MULTIPLE EDGES BETWEEN ADJACENT NODES

CROSS REFERENCE RELATED APPLICATIONS

This application is a national phase of PCT/CN2009/073696 filed Sep. 2, 2009, which claims priority to China Application Serial No. 200910107181.7, filed May 6, 2009, both of which are entirely incorporated herein by reference.

TECHNICAL FIELD

The present invention relates to the communication field, and particularly, to the routing technology therein.

BACKGROUND OF THE RELATED ART

A K-shortest paths algorithm is an algorithm solving the problem of obtaining a plurality of paths from specified source to destination nodes in the network topology. K paths which are sequenced from the small path weight summation to the large path weight summation can be obtained through this algorithm. The K-shortest paths algorithm is a very practical algorithm, which is widely applied in the fields such as the transportation, the communication routing calculation, the artificial intelligence, the economic theory research, and the mathematics application and so on. The K-shortest paths algorithm has very high application value, and can bring huge economic interests for users. For a long time, domestic and foreign academic circles have been deeply and widely researching the K-shortest paths algorithm, which aims to improve and enhance the efficiency of the algorithm, and reduce the time and space complexity of the algorithms as much as possible, thus many quite different K-shortest path algorithms emerged successively.

In recent years, along with the rapid development of the optical transport network Wavelength Switched Optical Network (WSON) technology, the K-shortest paths algorithm is more and more applied in solving the routing problem of the Routing and Wavelength Assignment (RWA) algorithm. Because the RWA itself has the non-deterministic polynomial feature, the inclusive R process for routing and the WA process for wavelength assignment should be implemented in two steps. The WA process of the WSON transport network in the prior art is generally not full wavelength switched. Because there is a limitation of the blocked cross restriction, K substitutable shortest paths need to be provided in the R process for routing calculation so that after the wavelength assignment (WA) fails in the selected path, substitutable paths can be provided to carry out the WA process over again. The RFC4655 and RFC4657 emphatically describe the function and architecture of the Path Computation Element (PCE) acting as the PCE of the Generalized Multiprotocol Label Switching (GMPLS). However, the problem of the K-shortest substitutable paths meeting the condition of the multiple edges between adjacent nodes is just a necessary function of the PCE in the condition of the WSON blocked cross.

In previous K-shortest paths algorithm documents, researchers usually only paid attention to the execution efficiency of the algorithm, and the research points in most cases were how to reduce the time and space complexity of the algorithm. However, few documents provide a thorough and detailed conclusion and summary on how to implement the K-shortest paths algorithm in different network topology scenarios. In the WSON networking environment, especially in the topological applications of multidimensional Reconfigurable Optical Add-Drop Multiplexer (ROADM) devices, the scenarios where there are multiple links between adjacent nodes often occur. Unfortunately, a great many known K-shortest paths algorithms at present usually requires the topographic to have a certain prerequisites:

1. the number of the sides m>=the number of the nodes n;
2. the weight of the sides w>0, and if the topographic is undirected, the bidirectional weights of sides should be equal;
3. the requirement for the directed or undirected topographic: some K-shortest paths algorithms definitely requires that they are only suitable for directed topographic.
4. the paths between any two nodes are not allowed to form a ring, namely, the paths do not include repeated nodes.
5. generally, the K-shortest paths algorithms are implemented based on the definition of the topographic: for the sides between adjacent nodes, the undirected topographic is restricted to have one directional side, and the directed topographic is restricted to have one side at most in positive direction and negative direction respectively (or a side exists in a certain direction, while no side exists in the other direction);

When K-shortest paths algorithms are implemented under the above prerequisites, a topographic scenario which is usually suitable for the calculation of the K-shortest paths algorithm is shown in FIG. 1.

However, in practical applications, there is often a case of multiple sides between adjacent nodes, as shown in FIG. 2. In this case, K-shortest paths algorithm generally cannot take other extra sides between the adjacent nodes into consideration, and only one side between adjacent nodes is reserved to participate in the calculation of the algorithm, and other sides are neglected and not participate in the calculation of the algorithm, and thereby the "K-shortest paths" calculated in such a way are not true K-shortest paths in the topology.

SUMMARY OF THE INVENTION

The main purpose of the present invention is to provide a method and apparatus for solving the problem of the K-shortest paths algorithm in the condition of multiple sides between adjacent nodes.

Therefore, the present invention puts forward a method for implementing a K-shortest paths algorithm in a condition of multiple sides between adjacent nodes: recording original topology information into a topology structure; modifying the original topology information, and if there are n original sides between two nodes, except for an original side with the shortest weight, adding one virtual node into each of the remaining n−1 original sides respectively, dividing a whole original side between original nodes into two sub segments by the virtual nodes, and each sub segment forming a new side, a weight of said new side being obtained by splitting a weight of the original side; according to modified topology information, calculating K-shortest paths between designated nodes; and checking each path in the calculated K-shortest paths in sequence: reinstituting hops which belong to the virtual nodes and new sides in each path into the original topology structure data recoded in the backup topology structure; wherein n≧2.

In the above method, if there are n original sides between two nodes, except for an original side with the shortest weight, one virtual node is added into each of the remaining n−1 original sides respectively, and the whole original side between the original nodes is divided into two sub segments; and the weight of the new sides is obtained by equally splitting the weight of the original sides.

At the same time, the present invention puts forward an apparatus for implementing a K-shortest paths algorithm in a condition of multiple sides between adjacent nodes, when K-shortest algorithm is implemented in a condition of multiple sides between adjacent nodes, the following steps are comprised: recording original topology information into a topology structure for backup; modifying the original topology information, and if there are n original sides between two nodes, except for an original side with the shortest weight, adding one virtual node into each of the remaining n−1 original sides respectively, dividing a whole original side between the original nodes into two sub segments by the virtual node, and each sub segment forming a new side, a weight of said new side being obtained by splitting a weight of the original side; according to modified topology information, calculating K-shortest paths between designated nodes; and checking each path in the calculated K-shortest paths in sequence: reinstituting hops which belong to the virtual nodes and new sides in each path into the original topology structure data recoded in said topology structure; wherein n≧2.

In the above apparatus for implementing a K-shortest paths algorithm in a condition of multiple sides between adjacent nodes, if there are n original sides between two nodes, except for an original side with the shortest weight, one virtual node is added into each of the remaining n−1 original sides respectively, and the whole original side between the original nodes is divided into two new sides.

In the condition of multiple sides between adjacent nodes, the method and apparatus of the present invention modifies the topology by virtual nodes and splitting corresponding original sides to enable each side to participate in the calculation of K-shortest paths algorithm, not simply neglecting the extra sides, thereby the results of the K-shortest paths algorithm are correct and reliable, and the true K-shortest paths in the topology can be calculated.

PREFERRED EMBODIMENTS OF THE PRESENT INVENTION

Below it will describe the present invention with reference to the figures and examples in detail.

Example One

The scenario of the topographic and algorithm where the method for implementing the K-shortest paths algorithm in the condition of multiple sides between adjacent nodes in this example meets the following preconditions:

1. the research object of this example is only restricted to the undirected topographic;

2. the K-shortest paths algorithm used in this example requires implementing by iteratively calling the Dijkstra algorithm essentially;

3. the number of the sides included in the topographic m>=the number of the nodes n;

4. a weight of a side included in the topographic is an integer, and the weight w>0;

5. the calculated path between any two nodes are not allowed to form a ring, namely the path do not include repeated nodes.

Figure 1:
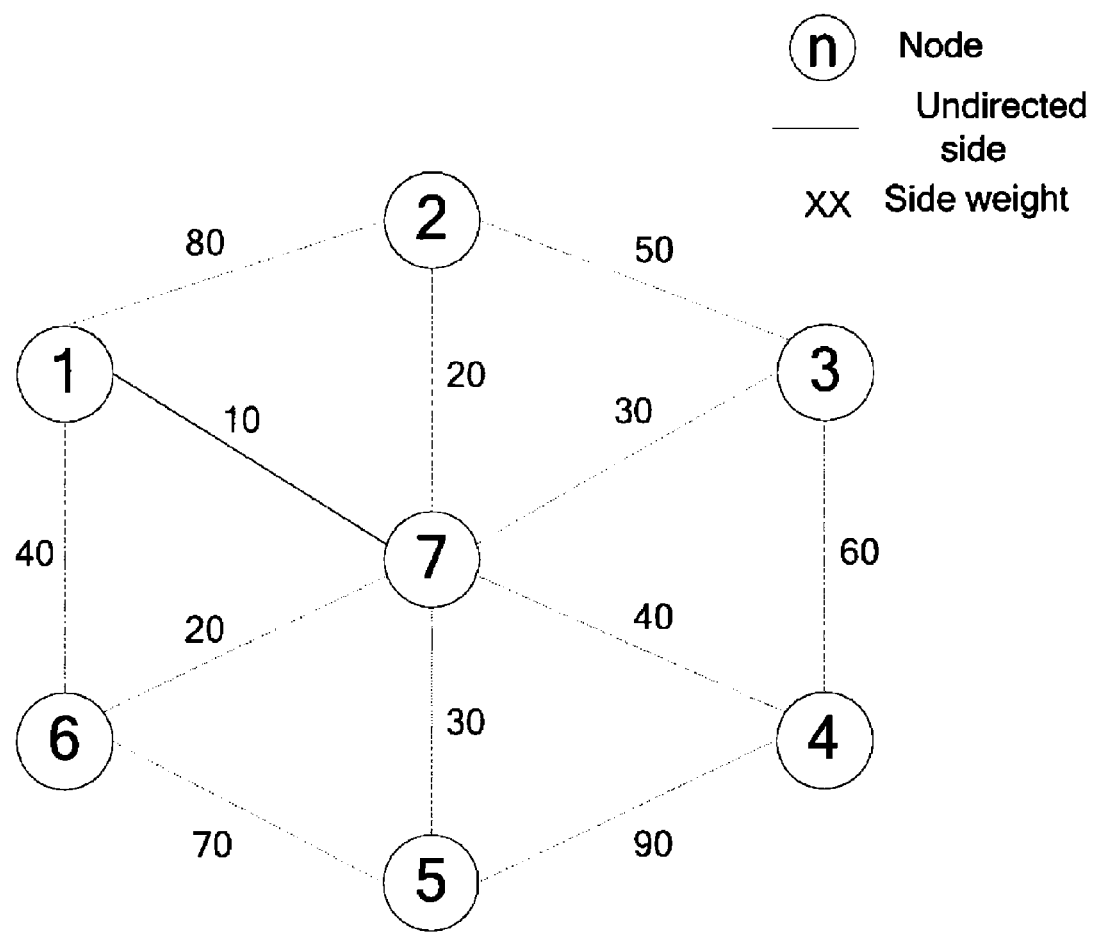
FIG. 1 is an example of a topographic scenario which is usually suitable for the K-shortest paths algorithms.
Figure 2:
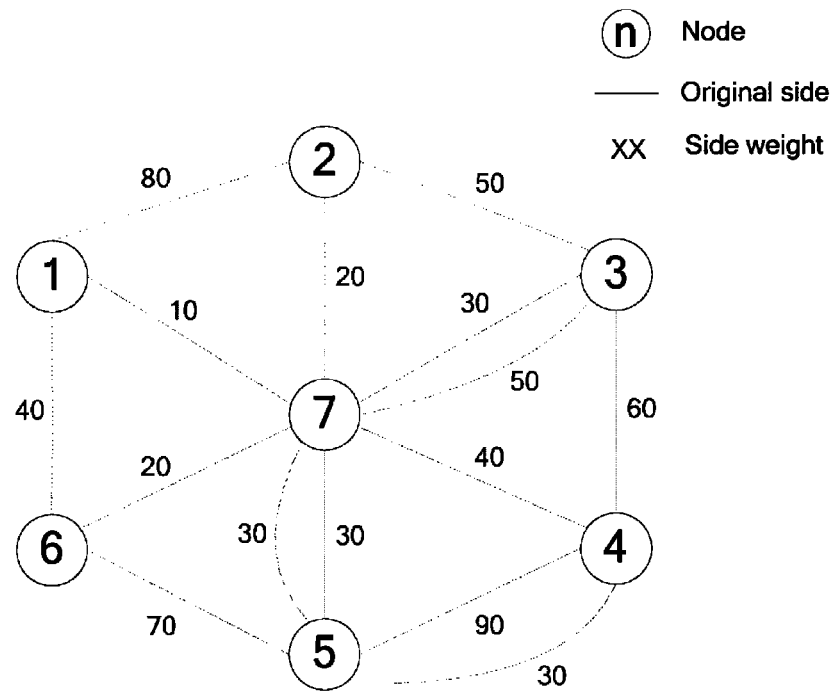
FIG. 2 is an example of a topographic scenario of multiple sides between adjacent nodes.

This example adopts the following solving steps:

1. the original topology information in FIG. 2 is recorded into the topology structure based on the K-shortest algorithm (which can be recorded in the format of the adjacency list) and is backed up; and the side existed in the original topology information is called the original side in this description;

2. if there are n original sides between two nodes, except for side with the shortest weight, a virtual node is added on each of the remaining n−1 original sides respectively, and the value range of the node IDs of the virtual nodes is not overlapped with that of the original nodes. Therefore, a whole original side between original nodes is divided into two sub segments, and each sub segment becomes into a new side which is called a new side in this description. The weight of the new side can be obtained by splitting the weight of the original side, as shown in FIG. 3.

Figure 3:
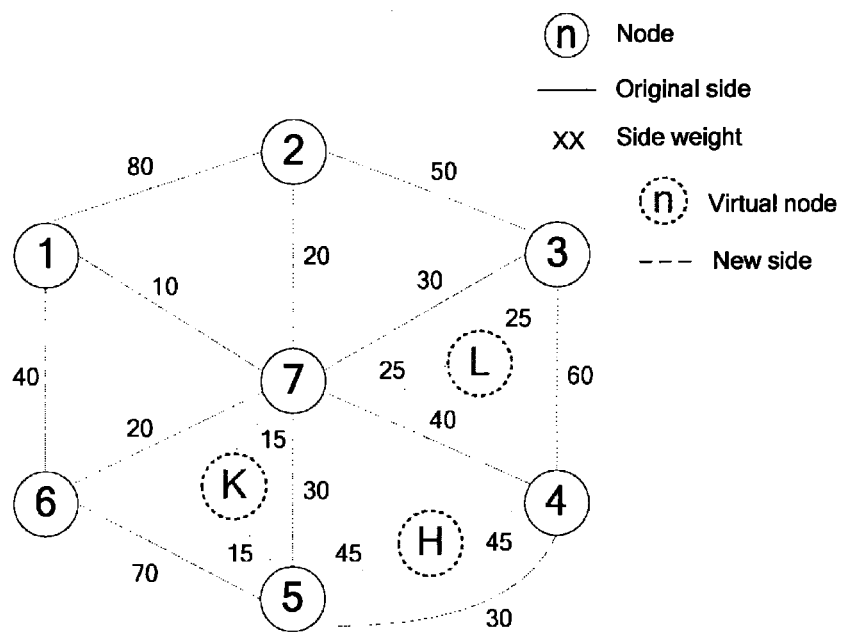
FIG. 3 is an example of a modified topographic scenario of multiple sides between adjacent nodes according to the example of the present invention.

3. according to the topology information of the FIG. 3, K-shortest paths between designated nodes are calculated;

4. each path in the calculated K-shortest paths is checked in sequence: all the hops which belong to the virtual nodes and new sides are restituted into the original side recorded in the topology structure based on the K-shortest algorithm; for example, for a certain shortest path from node 3 to node 5 obtained by the K-shortest paths algorithm according to FIG. 3, node 3-25-node L25-node 7-15-node K-15-node 5, can be restituted into the path information of node 3-50-node 7-30-node 5 according to the topology structure based on the K-shortest algorithm corresponding to FIG. 2.

Example Two

The scenario of the topographic and algorithm where the apparatus for implementing the K-shortest paths algorithm in the condition of multiple sides between adjacent nodes in this example implements K-shortest paths algorithm in the condition of multiple paths between adjacent nodes meets the following preconditions:

1. the research object of this example is only restricted to the undirected topographic;

2. the K-shortest path algorithm used in this example requires implementing by iteratively calling the Dijkstra algorithm essentially;

3. the number of the sides included in the topographic m>=the number of the nodes n;

4. a weight of a side included in the topographic is an integer, and the weight w>0;

5. the calculated path between any two nodes are not allowed to form a ring, namely the path do not include repeated nodes.

The apparatus in this example adopts the following solving steps to implement the K-shortest paths algorithm in the condition of multiple sides between adjacent nodes:

1. the original topology information in FIG. 2 is recorded into the topology structure based on the K-shortest algorithm (which can be recorded in the format of the adjacency list) and is backed up; and the side existed in the original topology information is called the original side in this description;

2. if there are n original sides between two nodes, except for the side with shortest weight, one virtual node is added on each of the remaining n−1 original sides respectively, and the value range of node IDs of the virtual nodes is not overlapped with that of the original nodes. Therefore, a whole original side between original nodes is divided into two sub segments, and each sub segment becomes into a new side which is called a new side in this description. The weight of the new side can be obtained by splitting the weight of the original side, as shown in FIG. 3.

3. according to the topology information of the FIG. 3, K-shortest paths between designated nodes are calculated;

4. each path in the calculated K-shortest paths is checked in sequence: all the hops which belong to the virtual nodes and new sides are restituted into the original sides recorded in the topology structure based on the K-shortest algorithm; for example, for a certain shortest path from node 3 to node 5 obtained by the K-shortest paths algorithm according to FIG. 3, node 3-25-node L-25-node 7-15-node K-15-node 5, can be restituted into the path information of node 3-50-node 7-30-node 5 according to the topology structure based on the K-shortest algorithm corresponding to FIG. 2.

Example Three

The difference between this example and example one is if the weight of some original side is 1, all the weights of original sides in the topology are enlarged 10 times, and then are split to the new sides, and after calculation, are restituted according to the above step 4.

Example Four

The difference between this example and example one is if the K-shortest paths algorithm is carried out according to the policy of the minimum hops, then all the weights of original sides can be temporarily set to 10, and the weights split to new sides are set to 5, and thereby the calculated route is obtained according to the policy of the minimum hops.

The above content describes the present invention in detail with reference to particular preferred embodiments, but it can not be considered that the implementation of the present invention is limited to the description. For a person having ordinary skill in the art, various simple derivation and substitution may be made on the present invention in the precondition without deviating from the spirit and scope of the invention, which are all covered by the protection scope of the present invention. For example, in above examples, if the weight of some original side is 1, all the weights of original sides in the topology can be enlarged any even times, which benefits for being split to new sides; and similarly, if the K-shortest paths algorithm is carried out according to the policy of the minimum hops, all the weights of all original sides can be temporarily set to any even number, and the weights spit to new sides are half of this even number.

INDUSTRIAL APPLICABILITY

In the condition of multiple sides between adjacent nodes, the method and apparatus of the present invention modifies the topographic by adding virtual nodes and splitting corresponding original sides to enable each side to participate in the calculation of K-shortest paths algorithm, not simply neglecting the extra sides, thereby the results of the K-shortest paths algorithm are correct and reliable, and the true K-shortest paths in the topology can be calculated.

What is claimed is:

1. A method for implementing a K-shortest paths algorithm in a condition of multiple sides between adjacent nodes, comprising the following steps of:
   recording original topology information into a topology structure;
   if there are n original sides between two nodes, except for a side with the shortest weight, adding one virtual node into each of the remaining n−1 original sides respectively to divide each of said n−1 original sides into two sub segments, and each said sub segment forming a new side, a weight of said new side being obtained by splitting a weight of an original side where the new side locates;
   according to topology information with the virtual nodes added into said n−1 original sides, calculating K-shortest paths between designated nodes; and
   checking each path in the calculated K-shortest paths in sequence: reinstituting hops which belong to the virtual nodes and new sides in each path into the original topology information recoded in said topology structure;
   wherein n≧2.

2. The method as claimed in claim 1, wherein said splitting is equally splitting.

3. The method as claimed in claim 1, wherein
   if an original side of which the weight is 1 exists,
   said step of a weight of said new side being obtained by splitting a weight of the original side where the new side locates comprises: enlarging a weight of each of the n−1 original sides except for the original side with the shortest weight between adjacent nodes in original topology information recoded in said topology structure an even number times, and splitting the enlarged weight into new sides;
   said reinstitution in said step of reinstituting hops which belong to the virtual nodes and new sides in each path into the original topology information recoded in said topology structure is carried out according to weights of said n−1 original sides before enlarging.

4. The method as claimed in claim 1, wherein
   if the K-shortest paths algorithm is implemented according to a policy of minimum hops,
   said step of a weight of said new side being obtained by splitting a weight of an original side where the new side locates comprises: setting a weight of each of the n−1 original sides except for the original side with the shortest weight between adjacent nodes in the original topology information recoded in said topology structure to a same even number, and weights of new sides are set to half of said even number;
   said reinstitution in said step of reinstituting hops which belong to the virtual nodes and new sides in each path into the original topology information recoded in said topology structure is carried out according to weights of said n−1 original sides before setting to said even number.

5. The method as claimed in claim 1, wherein a value range of node IDs of the virtual nodes is not overlapped with that of node IDs of said nodes.

6. The method as claimed in claim 3, wherein said even times is an integer times of 10.

7. The method as claimed in claim 4, wherein said even number is 10.

8. An apparatus for implementing a K-shortest paths algorithm in a condition of multiple sides between adjacent nodes, which is configured to: record original topology information into a topology structure for backup; if there are n original sides between two nodes, except for a side with the shortest weight, add one virtual node into each of the remaining n−1 original sides respectively, divide a whole original side between original nodes into a plurality of sub segments, wherein each said sub segment forms a new side and a weight of said new side is obtained by splitting a weight of the original side; according to modified topology information, calculate K-shortest paths between designated nodes; and check each path in the calculated K-shortest paths in sequence: reinstituting hops which belong to the virtual nodes and new sides in each path into the original topology structure data recoded in backup topology structure; wherein n≧2.

9. The apparatus as claimed in claim 8, wherein if there are n original sides between two nodes, one virtual node is added into each of the remaining n−1 original sides except for the original side with the shortest weight respectively to divide each of said n−1 original sides into two new sides.

10. The method as claimed in claim 2, wherein
if an original side of which the weight is 1 exists,
said step of a weight of said new side being obtained by splitting a weight of the original side where the new side locates comprises: enlarging a weight of each of the n−1 original sides except for the original side with the shortest weight between adjacent nodes in original topology information recoded in said topology structure an even number times, and splitting the enlarged weight into new sides;
said reinstitution in said step of reinstituting hops which belong to the virtual nodes and new sides in each path into the original topology information recoded in said topology structure is carried out according to weights of said n−1 original sides before enlarging.

11. The method as claimed in claim 2, wherein
if the K-shortest paths algorithm is implemented according to a policy of minimum hops,
said step of a weight of said new side being obtained by splitting a weight of an original side where the new side locates comprises: setting a weight of each of the n−1 original sides except for the original side with the shortest weight between adjacent nodes in the original topology information recoded in said topology structure to a same even number, and weights of new sides are set to half of said even number;
said reinstitution in said step of reinstituting hops which belong to the virtual nodes and new sides in each path into the original topology information recoded in said topology structure is carried out according to weights of said n−1 original sides before setting to said even number.

12. The method as claimed in claim 2, wherein a value range of node IDs of the virtual nodes is not overlapped with that of node IDs of said nodes.

\* \* \* \* \*